UNITED STATES PATENT OFFICE.

EDWIN W. LASBY, OF ST. LOUIS, MISSOURI.

FOOD COMPOUND.

977,746.

Specification of Letters Patent.

Patented Dec. 6, 1910.

No Drawing. Application filed January 5, 1910. Serial No. 536,568.

*To all whom it may concern:*

Be it known that I, EDWIN W. LASBY, citizen of the United States, residing at St. Louis, in the State of Missouri, have invented certain new and useful Improvements in Food Compounds, of which the following is a specification.

The object of the present invention is to produce a compound for use in making macaroons, or like cakes, the compound being designed to be put up and sold in place of almond paste.

The usual composition from which macaroons are made is as follows:—almond paste five pounds; sugar five pounds, and one quart of whites of eggs. The eggs alone in this composition are quite expensive, but the cost of the product is, of course, materially increased by the time and labor involved in cracking the eggs and separating the whites from the yolks. It has been heretofore attempted to overcome this objection by substituting dried whites of eggs (albumen) for the whites of eggs in the above composition, (see patent to Heide and Wirtz, No. 170,368.) However, this has not been found successful in practice on account of the fact that the whites of eggs lose some of their properties when dried and fail to give the compound the requisite consistency so that the cakes are held in the desired shape.

In my invention I employ a mixture in lieu of the whites of eggs, consisting of the following ingredients in about the proportions set forth, to wit:—albumen, or dried whites of eggs, one part, by weight, gelatin, (first quality) one part, by weight, and rice flour one-half part by weight. The above ingredients are in a finely powdered condition, and constitute what I term as mixture number one. I have found that in this mixture the gelatin and the rice flour supply the properties of the white of egg that are lost in the drying process.

Mixture number one may be put upon the market in suitable cans or jars to be used in food compounds as a substitute for whites of eggs, or else I may put upon the market the following mixture that is known as mixture number two, and which consists of almond paste, sixty-four parts, by weight, albumen (dried white of egg) two parts, by weight; gelatin two parts, by weight; and dried rice flour, one part, by weight. The above ingredients are thoroughly mixed together. The product is a dense dry paste which is so firm and dry that it may be cut into slices with a knife.

The final compound from which macaroons are made when using mixture number two, consists of the following ingredients:—mixture number two five pounds; sugar five pounds and one quart of water. The ingredients are stirred together to form a mass of the proper consistency and the cakes are made out from this mass and baked. Attention is particularly directed to the fact that the gelatin and rice flour supply the thick and jelly like part of the eggs, which is lost in the drying process. Furthermore the gelatin gives the macaroons a brighter appearance and holds the moisture longer than the whites of eggs, thereby increasing the preservative qualities of the macaroons. Hence the macaroons made with my improved compound are of better appearance and quality than those macaroons made from the usual composition of almond paste, sugar and whites of eggs. It will therefore be apparent that I have not only improved the quality of the macaroons but have succeeded in producing a composition for making macaroons which does not require fresh eggs.

It is to be understood that in the mixtures above mentioned, the proportions of the ingredients may be varied by employing ingredients of different qualities or strength.

Having thus described the invention what is claimed as new is:—

1. The herein described food compound consisting of almond paste, dried white of egg, gelatin, and rice flour, thoroughly mixed in about the proportions specified, the product being dry and firm.

2. The herein described food compound for preparing macaroons, consisting of almond paste, sixty-four parts, by weight; dried white of the egg, two parts, by weight; gelatin two parts, by weight; and rice flour, one part, by weight, the product being dense, dry and firm.

In testimony whereof I affix my signature in presence of two witnesses.

EDWIN W. LASBY. [L. S.]

Witnesses:
SAMUEL P. MCCHESNEY,
OLIVER B. ROOT.